US006879961B1

(12) United States Patent
Pathirana

(10) Patent No.: US 6,879,961 B1
(45) Date of Patent: Apr. 12, 2005

(54) APPARATUS AND SYSTEM FOR DISPLAYING WARES AND SERVICES INCLUDING A MANNEQUIN AND INTERACTIVE DISPLAY PANEL

(76) Inventor: Upali D. Pathirana, Bluemelhofweg 2d, A.8044, Graz (AT)

( * ) Notice: Subject to any disclaimer, the term of this patent is extended or adjusted under 35 U.S.C. 154(b) by 697 days.

(21) Appl. No.: 09/624,825

(22) Filed: Jul. 25, 2000

Related U.S. Application Data

(60) Provisional application No. 60/145,622, filed on Jul. 26, 1999.

(51) Int. Cl.[7] .............................................. G06F 17/60
(52) U.S. Cl. ........................... 705/16; 705/27; D20/31; 434/396
(58) Field of Search .............................. 705/16, 20, 21, 705/22, 24, 27; D20/31, 32, 33; 902/30; 434/395, 396, 397, 398, 399, 400

(56) References Cited

U.S. PATENT DOCUMENTS

| | | | | |
|---|---|---|---|---|
| D199,471 S | * | 10/1964 | Leibow | D10/109 |
| 4,622,771 A | * | 11/1986 | Spengler | 40/547 |
| D329,664 S | * | 9/1992 | Wagener | D20/31 |
| 5,441,414 A | * | 8/1995 | Chretien | 434/307 R |
| 5,535,921 A | * | 7/1996 | Gelman et al. | 222/78 |
| 6,026,987 A | * | 2/2000 | Burnett et al. | 222/78 |
| 6,193,519 B1 | * | 2/2001 | Eggert et al. | 434/262 |
| D442,996 S | * | 5/2001 | Chow | D20/31 |
| 6,318,536 B1 | * | 11/2001 | Korman et al. | 194/217 |
| D462,999 S | * | 9/2002 | Evans et al. | D20/31 |

FOREIGN PATENT DOCUMENTS

GB      2175729 A     * 12/1986

OTHER PUBLICATIONS

Brand Name Fashion Now Online from NY's Leading Garment Manufacturers, PRNewswire, Aug. 26, 1999, 2 pages.*

* cited by examiner

Primary Examiner—James S. McClellan
(74) Attorney, Agent, or Firm—Stites & Harbison PLLC; David W. Nagle, Jr.

(57) ABSTRACT

The present invention relates to a marketing apparatus that is a combination of a mannequin and an interactive system. The mannequin holds in its "hands" an interactive panel which is hard-wired to a computer control station. By using the interactive panel, prospective customers can obtain information about selected wares and services. The mannequin may be attired to promote specific wares and services. The mannequin may be designed to "speak" to prospective customers through the inclusion of appropriate computer controls and a voice synthesizer, and it may be configured to prevent theft or unauthorized removal of the display panel from the hands of the mannequin.

9 Claims, 2 Drawing Sheets

APPARATUS AND SYSTEM FOR DISPLAYING WARES AND SERVICES INCLUDING A MANNEQUIN AND INTERACTIVE DISPLAY PANEL

CROSS-REFERENCE TO RELATED APPLICATION

This application claims priority from U.S. Provisional Application Ser. No. 60/145,622, filed Jul. 26, 1999, which application is incorporated herein by reference in its entirety.

BACKGROUND

The present development relates to a mannequin having an interactive display panel to be primarily used in public places such as shopping malls, airports, and the like for advertising wares and services and for providing information concerning the same.

The use of models and human looking display mannequins for advertising consumer goods is well known. The mannequins are positioned in store windows and other places frequented by consumers to display apparel or other selected consumer products. In some instances, the mannequins may be designed to be responsive to their environment. For example, in U.S. Pat. No. 6,026,987, an aroma dispensing system is concealed within a mannequin, and a predetermined quantity of fragrance is emitted into the environment when a proximity sensor within the mannequin detects consumers close to the mannequin. The mannequins of the '987 patent may further include a sound reproduction system that can be programmed to tell the consumer about the fragrance. However, these mannequins are not designed to allow the consumer to interact with the mannequin and request specific information about the product being advertised.

Because consumers are more likely to purchase an item if they can easily locate the item or if they can learn more about it, it would be advantageous to have a display mannequin that can interact with the consumer. For example, if a mannequin is attired in a particular garment in a display at a shopping center, it would be beneficial if an interested consumer could "question" the mannequin to determine which store sold the garment, where that store was located with respect to the display, how much the garment cost, and similar normally asked questions. Having mannequins designed to answer these questions could save the consumer time otherwise spent trying to locate the item of interest, and could increase the profits for the merchant by increasing clientele and by reducing labor costs associated with personnel answering repeat questions from prospective consumers.

SUMMARY OF THE INVENTION

The present invention relates to a marketing apparatus that is a combination of a mannequin and an interactive system. The mannequin provides an opportunity for participating stores to attract prospective customers to the marketing apparatus where selected wares and services can be advertised. The mannequin and the interactive system serve complimentary purposes with much of the hardware of the system including computer controls for operating the system housed within the mannequin. The mannequin in turn holds firmly in its "hands" a display device, or interactive panel, which is hard-wired to the computer controls. In this manner, adjacent pedestrians and shoppers attracted by the mannequin can easily use the display panel to obtain further information concerning certain merchandise and services.

In an alternative embodiment, the mannequin may be designed to "speak" to prospective customers through the inclusion of appropriate computer controls and a voice synthesizer. The voice may be activated through a proximity sensor, or through commands inputted into the control system through the interactive display panel. For example, the mannequin may cordially address persons standing in front of the mannequin, it may encourage prospective customers to use the display panel to obtain information about the merchandise or services being sold, it may offer further information concerning the goods and services, it may provide directions to the store featuring the items of interest, it may extend congratulatory messages in response to input from the interactive display device, or it may make other statements as so desired by the merchant. Additionally, the control system may further be provided with speech recognition capabilities that permits the control system to orally respond to certain verbal requests once a function on the interactive display panel has been activated and inputted.

Optionally, the mannequin may be configured to prevent theft or unauthorized removal of the display panel from the hands of the mannequin. In this embodiment, the controller could be programmed to orally warn the user not to remove the module upon detection of undue movement to the module and then sound an alarm if the movement continues.

DETAILED DESCRIPTION OF A PREFERRED EMBODIMENT

Figure 1:
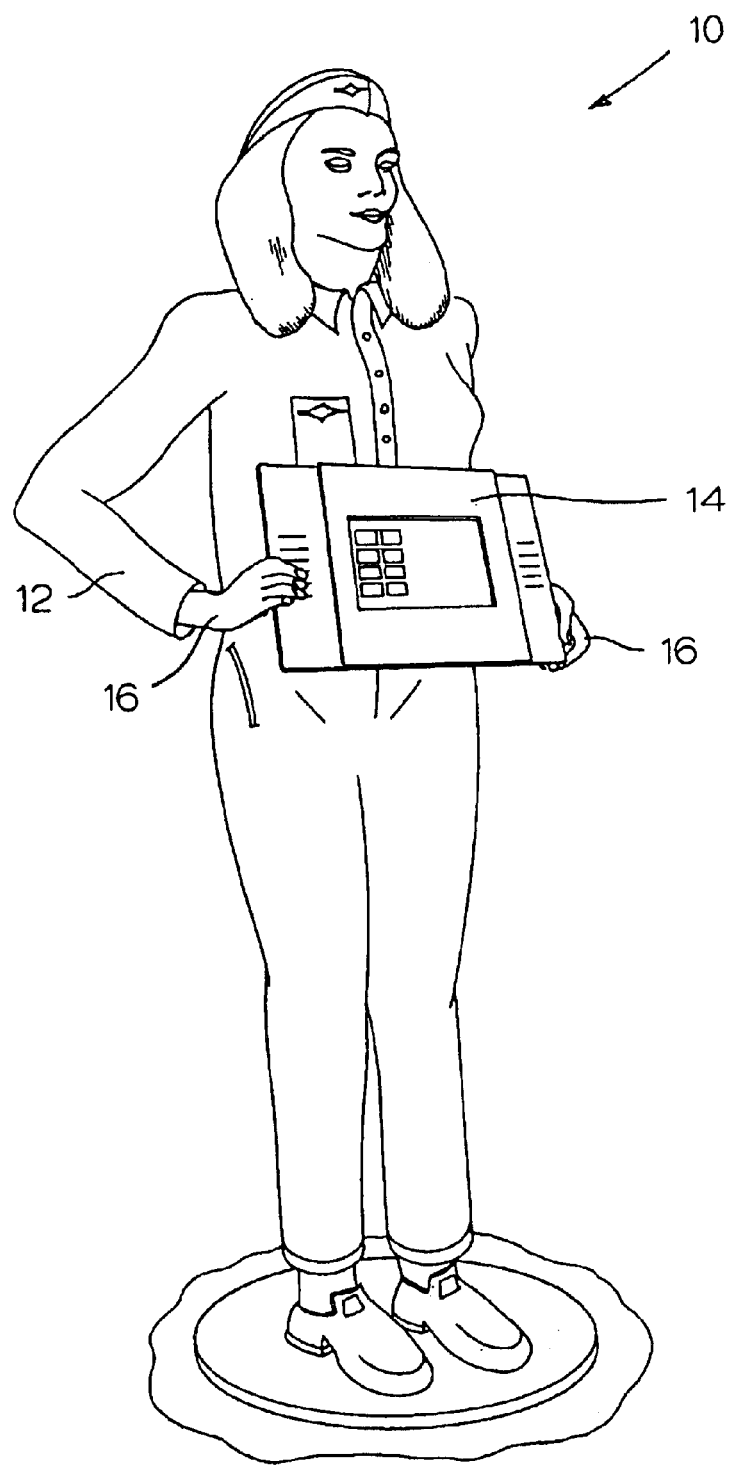
FIG. 1 is a schematic of one embodiment of a marketing apparatus of the present invention including a mannequin attired as a flight attendant holding an interactive display panel.

FIG. 1 shows an embodiment of the marketing apparatus of the present development including a mannequin 10 holding an interactive display panel 14. The mannequin 10 itself may be dressed in or wearing articles available for purchase and described in the information available through use of the interactive display panel 14. Optionally, the mannequin 10 may be dressed to promote a service. For example, as shown in FIG. 1, the interactive display panel 14 held by a mannequin 10 attired as a flight attendant could provide information concerning flights, or it could actually permit the purchase of tickets through the interactive display panel 14. The mannequin 10, through the interactive display panel 14, may also promote services available near the mannequin display site, such as hair styling services. The interactive display panel 14 is preferably connected by wiring internally disposed within the mannequin 10 to a control system 18, similar to that indicated in the block diagram shown in FIG. 2. Among other things, the control system 18 provides the relevant feedback to the prospective customer.

Referring initially to the schematic of FIG. 1, the marketing apparatus includes the mannequin 10 with arms 12, preferably slightly outstretched, holding the interactive display panel 14 in its hands 16. The display panel 14 may be secured to the hands 16 by a set of screws or fasteners, the heads of which are positioned within bores located in the hands and covered by a flesh colored material to preserve the life-like appearance promoted by the use of the mannequin. To provide upright stability to the mannequin 10, particularly when the interactive panel 14 is being used by customers, the mannequin may be secured to the support floor by fasteners of choice. Alternatively, the mannequin 10 may be juxtaposed against a wall or a support column or the like and similarly secured to provide the needed stability.

The display panel 14 provides a surface that is touch sensitive so that the system can provide information in response to the user touching the surface while following menu instructions. Preferably, the interactive display panel 14 is a touch screen made of a shatter proof material that takes advantage of the thin and light weight panel monitor displays that are now technically available through the advent of liquid crystal light emitting materials and the rapidly evolving speech recognition capabilities of computers. However, any type of interactive panel which can be connected to a central control system 18 may be used. Use of the shatter proof screen material minimizes possible damage due to use by customers or attempted vandalism. Optionally, the control system 18 may be configured such that the mannequin 10 can respond to prospective customer requests without the need for the customer to contact the display panel 14, such as by the inclusion of proximity sensors or voice recognition devices.

Figure 2:
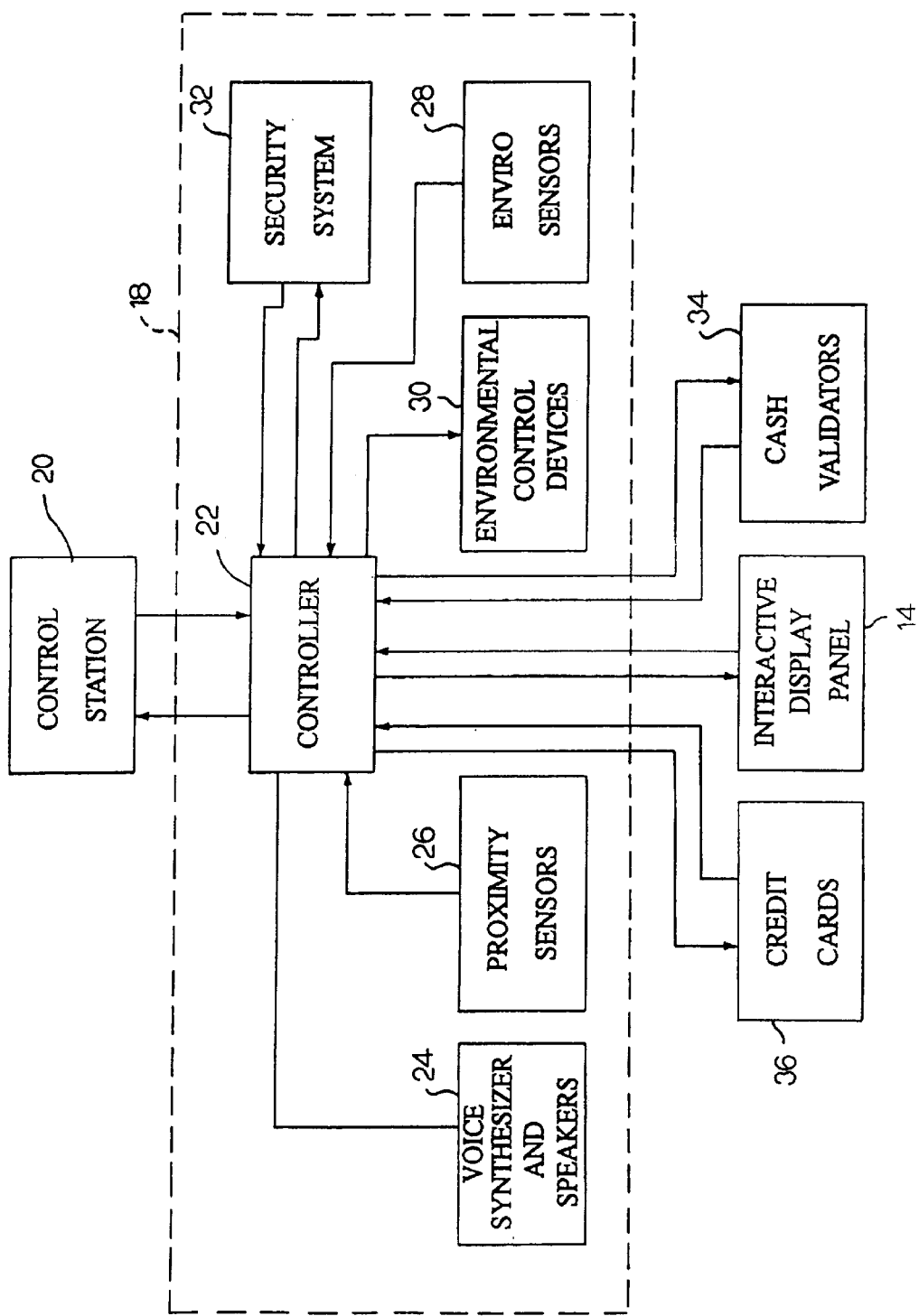
FIG. 2 is a block diagram showing the various components of the system used in cooperation with the mannequin to perform the interactive functions.

As indicated in the block diagram shown in FIG. 2, the control system 18 to be used with the mannequin 10 and interactive display panel 14 is preferably connected by wiring internally disposed within the mannequin 10. Specifically, within the mannequin 10 is a controller 22 which principally interconnects a remote control station 20 and the interactive display panel 14. The software used by the controller 22 will preferably be installed at the remote control station 20, thereby allowing the merchant to modify the software as desired to address the customer needs. Alternatively, if the information to be provided to the consumer is routine, the controller 22 may not be connected to a remote control station 20, but rather may include a means that allows the information within the controller 22 to be periodically updated by use of a control data disk (not shown). For example, the disk system may be more cost efficient than having a remote control station 20 when the information to be transferred is routine schedules, such as airline flight information.

Optionally, the portion of the system 18 housed within the mannequin 10 may include a voice synthesizer and speakers shown schematically by box 24 in FIG. 2 so that instructions and greetings may be supplied, when deemed appropriate, to the customer during the interactive transaction. For example, via the system and speakers, the mannequin 10 may cordially address persons standing in front of it, it 10 may encourage prospective customers to use the display panel 14 to obtain information about the merchandise or services being sold, it 10 may offer further information concerning the goods and services, it 10 may provide directions to the store featuring the items of interest, it 10 may extend congratulatory messages in response to input from the interactive display device, or it 10 may make other statements as so desired by the merchant. Additionally, the control system 18 may further be provided with speech recognition capabilities that permits the control system 18 to orally respond to certain verbal requests once a function on the interactive display panel has been activated and inputted. Additionally, the mannequin 10 may house proximity sensors 26 responsive to movement or the like that would signal the controller 22 to supply an appropriate greeting or salutation to the prospective customer.

Because the locations of prime interest for use of the interactive display panel 14 and mannequin 10 are roofed locations located out of doors such as, for example, transportation stops at airports, it is important that the internal wiring and components of the system located within the mannequin 10 be subjected to some environmental control to reduce the ambient humidity within the mannequin 10. The environmental controls may include sensors 28 alerting the controller 22 to operate an appropriate environmental device 30, such as a de-humidifier, heater, fan or combination thereof, as needed, to control the internal temperature and humidity within the mannequin 10.

Further, because the mannequin 10 is likely to be positioned at a location that is removed from the merchant, there may be a need for the mannequin 10 to be configured to prevent theft or unauthorized removal of the display panel 14 from the hands 16 of the mannequin 10. Thus, the system 18 may incorporate a security system 32 including warning alarm or lights that are energized in the event that an unauthorized attempt is made to remove the display panel. Depending on the desires of the merchant, the controller 22 could be programmed to warn the user not to remove the panel 14 upon detection of undue movement to the panel 14 and then sound an alarm if the movement continues.

To ensure that the system will restart in case of a software crash of the controller, it is preferably to include "watch dog" software that initiates a restart in the event of such a crash. Additionally, instead of hardwiring the components within the mannequin 10 in situations where telephone lines or other hardwired communication lines are unavailable, use may be made of wireless-LAN connections to connect the mannequin 10 to the control station 20 through a communication system such as the Internet or a similar network web.

Optionally, the system 18 can be configured to allow the prospective customer to conduct various commercial transactions through the display panel 14, such as, purchasing travel tickets or other services or wares. In this embodiment, the system 18 would further include a cash validator 34 to accept coins and paper currency, or a credit or debit card reading/accepting device 36, or both 34, 36. The payment information would then be transmitted to the controller 22 or to the control station 20 for validation and acceptance of the desired purchase, and an acknowledgment or confirmation of the transaction would then appear on the display panel 14. A prime example of a beneficial use of the system is the electronic purchase of airline tickets that need no print out of the ticket itself but only later proof of purchase when boarding.

It will be obvious to those skilled in the art that modifications may be made to the embodiments described above without departing from the scope of the present invention.

What is claimed is:

1. An apparatus and system for displaying wares and services to prospective customers, comprising;
   a mannequin with at least partially outstretched arms terminating in hands, said mannequin secured at a base thereof to an underlying support surface and adapted to wear clothing and articles relating to wares and services offered for sale;
   a control system for storing information pertaining to the wares and services; and
   an interactive display panel attached to said hands, said panel communicating with said control system through wires hidden within said arms and hands of said mannequin whereby prospective customers can obtain the information pertaining to the wares and services by operating said interactive display panel.

2. The system of claim 1 including a means for detecting changes in temperature and humidity within said mannequin and means responsive to said detecting means for maintaining the temperature and humidity at predetermined levels.

3. The system of claim 1 including a means for sensing the presence of a prospective customer and a voice synthesizer, said control system being responsive to said sensing means by causing said voice synthesizer to initiate a greeting.

4. The system of claim 1 including a means for detecting undue motion of said interactive display panel, said means causing an alarm to sound.

5. The system of claim 1 in which said control system is remotely located.

6. The system of claim 1 including a means to accept and acknowledge payment for commercial transactions through said interactive display panel.

7. An apparatus for displaying wares and/or services to prospective customers, comprising:

a mannequin wearing articles relating to the wares and/or services offered for sale and having partially outstretched arms terminating in hands;

a control system for storing information pertaining to the wares and/or services; and an interactive display panel attached to the hands of said mannequin and in communication with said control system, such that prospective customers of the wares and/or services can access information pertaining to the wares and/or services through operation of the interactive display panel.

8. The apparatus as recited in claim 7, wherein said interactive display panel communicates with said control system through wires hidden within the arms and hands of said mannequin.

9. The apparatus as recited in claim 7, wherein said interactive display panel communicates with said control system through a wireless connection.

\* \* \* \* \*